United States Patent Office 3,280,156
Patented Oct. 18, 1966

3,280,156
17β-HYDROXYSPIRO(ESTR-4-ENE-16,1'-CYCLOPROPAN)-3-ONES
David A. Tyner, Glenview, Ill., assignor to G. D. Searle & Co., Chicago, Ill., a corporation of Delaware
No Drawing. Filed Oct. 13, 1965, Ser. No. 495,686
12 Claims. (Cl. 260—397.4)

The present invention relates to a group of steroids with a cyclopropane group attached thereto to give a spiro structure. More particularly, the present invention relates to a group of compounds having the following general formula

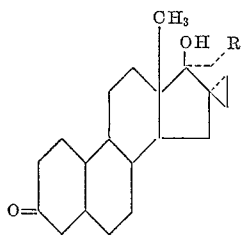

wherein R is selected from the group consisting of hydrogen, lower alkyl, lower alkenyl, and lower alkynyl; and wherein there is a double bond solely in one of the positions 4(5) and 5(10). Each of the carbon containing radicals can contain up to 6 carbon atoms. Thus, examples of lower alkyl are methyl, ethyl, propyl, and butyl; examples of lower alkenyl are vinyl, propenyl, allyl, and methallyl; and examples of lower alkynyl are ethynyl, propynyl, and butynyl.

The compounds of this invention are useful because of their valuable pharmacological properties. In particular, they are hormonal agents as evidenced by their anabolic, androgenic, and progestational properties.

The compounds of the present invention are conveniently prepared from 3-methoxyspiro(estra-1,3,5(10)-triene-16,1'-cyclopropan)-17-one. This spiro compound is obtained from 3-methoxy-16-methylene-1,3,5(10)-estratrien-17-one by reaction with diazomethane to give a spiropyrazoline and then decomposition of the pyrazoline, either thermally or by means of acid, to give the desired spirocyclopropane.

The indicated cyclopropane is useful as an intermediate because it can be converted to compounds of the following type

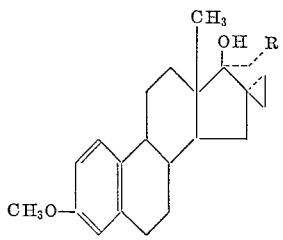

wherein R is hydrogen, lower alkyl, lower alkenyl, or lower alkynyl. Thus, reduction of the 17-ketone gives the corresponding 17β-alcohol, the compound in which R in the above formula is hydrogen. Reaction of the 17-ketone with the appropriate Grignard reagent or appropriate organometallic compounds gives the correspondingly substituted 17α-compound; that is, the compounds in which R in the above formula is lower alkyl, lower alkenyl, or lower alkynyl. Examples of compounds which can be used in this way are methyl magnesium iodide and lithium acetylide.

The estra-1,3,5(10)-trien-17β-ols described in the above formula are then reduced with sodium in liquid ammonia to give the corresponding estra-2,5(10)-dien-17β-ols having the following formula

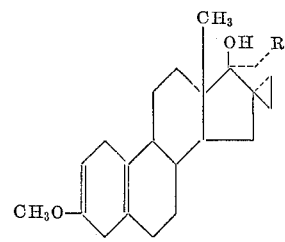

wherein R is defined as above. This diene, which is an enol ether and useful as an intermediate, is then hydrolyzed to the ketone and the remaining 5(10)-double bond can be isomerized to the 4-position.

A number of alternate procedures for obtaining certain compounds of the present invention are also available. Thus, the 17α-alkynyl compounds, either the estratriene or the estr-4-en-3-one, can be reduced with hydrogen and palladium-on-calcium carbonate to give the corresponding 17α-alkenyl compounds, or the alkynyl compounds can be reduced with hydrogen and palladium-on-charcoal to give the corresponding 17α-alkyl compounds.

In another alternate procedure, the estr-2,5(10)-diene in which R is hydrogen can be oxidized with aluminum isopropoxide or a similar reagent to give the corresponding 17-ketone which is then reacted with the appropriate Grignard reagent or organometallic compound to give the corresponding 17α-substituted-17β-ol. The resultant diene is then hydrolyzed and isomerized in the manner described above.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that existing between grams and milliliters.

*Example 1*

To a solution of 20 parts of 3-methoxy-16-methylene-1,3,5(10)-estratrien-17-one and 0.2 part of methanol in 180 parts of tetrahydrofuran is added a dried ether solution of the diazomethane obtained from 12 parts of N-nitrosomethylurea. The mixture is allowed to stand at room temperature for 16 hours and then the solvent is removed under reduced pressure. The resultant residue is then heated with ethanol. The ethanol solution is cooled and the crystalline product which forms is separated and recrystallized from a mixture of tetrahydrofuran and ethanol to give 3-methoxyspiro(estra-1,3,5(10)-triene-16,3'-1'-pyrazolin)-17-one melting at about 153–155° C. with decomposition.

20.6 parts of the pyrazoline obtained in the preceding paragraph is suspended in 80 parts of acetone at 15–18° C. under a nitrogen atmosphere. To this suspension is added 4.5 parts of 48% boron trifluoride etherate. The solid dissolves in about 30 minutes and then a different solid starts to precipitate. After a total of 50 minutes, 400 parts of ice and water is added to the mixture which is cooled in an ice bath. The solid which forms is separated, washed, and dried. It is then recrystallized from ethyl acetate to give 3-methoxyspiro(estra-1,3,5(10)- triene-16,1'-cyclopropan)-17-one melting at about 141–144° C. This compound has the following formula

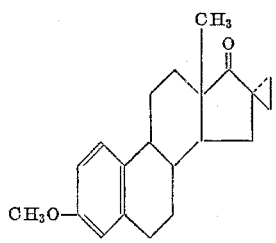

Example 2

A solution of 1.1 parts of 3-methoxyspiro(estra-1,3,5-(10)-triene-16,1'-cyclopropan)-17-one in 10 parts of benzene and 10 parts of ether is stirred and refluxed under nitrogen and 5 parts by volume of 3 m. methyl magnesium iodide in ether is added. After 5 hours, ethyl acetate is added to the mixture to decompose excess Grignard. The resultant solution is then washed with ammonium chloride solution and dried and the solvent is evaporated under reduced pressure to leave a glass. This is crystallized twice from pentane to give 3-methoxy-17α-methylspiro-(estra-1,3,5(10)-triene-16,1'-cyclopropan)-17β-ol melting at about 67–68° C.

Example 3

To a stirred solution of 5.3 parts of 3-methoxy-17α-methylspiro(estra-1,3,5(10) - triene - 16,1'-cyclopropan)-17β-ol in 225 parts of tetrahydrofuran, 50 parts of 2-butyl alcohol, and 500 parts by volume of distilled liquid ammonia, there is added 5 parts of sodium. The blue color disappears in about 2 hours. 10 parts of methanol is then added and the mixture is steam distilled. The resultant residue is then extracted with methylene chloride and the extract is washed, dried and concentrated to a small volume. Ethanol and a trace of pyridine are added to the solution which is then heated to remove the methylene chloride. The resultant solution is then cooled to give a granular solid melting at about 142–143.5° C. This product is 3-methoxy - 17α - methylspiro(estra-2,5(10)-diene-16,1'-cyclopropan)-17β-ol.

To a hot solution of 2 parts of the above diene in 15 parts of methanol and 5 parts of acetic acid there is added, under a nitrogen atmosphere, 5 parts of water. The resultant solution is kept at about 40° C. for about 30 minutes and then concentrated under a stream of nitrogen until solid material starts to appear. The resultant mixture is then warmed and once again allowed to cool. The crystalline solid which forms is separated, washed with water, and dried. It is recrystallized twice from methanol to give 17β-hydroxy-17α-methylspiro(estr-5(10)-ene-16,1'-cyclopropan)-3-one melting at about 132–134° C.

A solution of 1.4 parts of the above estr-5(10)-ene in 10 parts of methanol is prepared and, under a nitrogen atmosphere, 0.1 part of 4 N sodium hydroxide solution is added at room temperature. The solution is allowed to stand for 90 minutes and then diluted with water and cooled. A fine precipitate forms. This is separated, washed, and dried, and then recrystallized from aqueous methanol to give 17β-hydroxy-17α-methylspiro(estr-4-ene-16,1'-cyclopropan)-3-one which melts at about 108–110° C., resolidifies, and then melts again at about 132–133° C. Infrared maxima are observed at 2.77, 5.98, and 6.16 microns. The compound has the following formula

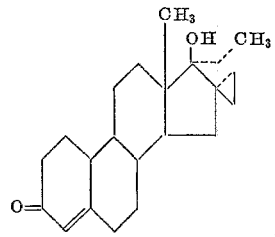

Example 4

To a stirred solution of 3.7 parts of 3-methoxyspiro-(estra-1,3,5(10)-triene-16,1'-cyclopropan)-17-one in 90 parts of tetrahydrofuran saturated with acetylene is added 4 parts of lithium acetylide-ethylenediamine complex. The resultant mixture is stirred at room temperature for 5 hours and then poured into ice and 400 parts of water containing 10 parts of acetic acid; a vigorous evolution of acetylene takes place. The resultant mixture is then extracted with ether and the solvent is evaporated from the combined ether extracts under reduced pressure. The resultant residue is recrystallized, first from pentane and then from hexane, to give 17α-ethynyl-3-methoxyspiro-(estra-1,3,5(10)-triene-16,1'-cyclopropan)-17β-ol melting at about 104–105° C.

Example 5

A solution of 3 parts of 17α-ethynyl-3-methoxyspiro-(estra-1,3,5(10)-triene-16,1'-cyclopropan)-17β-ol in 90 parts of tetrahydrofuran is hydrogenated over 0.3 part of 5% palladium-on-charcoal catalyst for 2 hours at room temperature and atmospheric pressure. The catalyst is then removed by filtration and the solvent is evaporated from the filtrate to leave a residual solid which is crystallized from pentane. The product thus obtained is 17α-ethyl-3-methoxyspiro(estra - 1,3,5(10)-triene-16,1' - cyclopropan)-17β-ol melting at about 80–83° C.

Example 6

A solution is prepared from 2.4 parts of 17α-ethyl-3-methoxyspiro(estra - 1,3,5(10)-triene-16,1'-cyclopropan)-17β-ol, 250 parts by volume of redistilled liquid ammonia, 90 parts of tetrahydrofuran, and 25 parts of t-butyl alcohol. 2.5 parts of sodium is added to the solution. The blue color disappears after about 70 minutes; 10 parts of methanol is added, and the mixture is steam distilled to remove volatile substances. The residue is then extracted with methylene chloride and the combined extracts are washed and dried and the solvent is evaporated under reduced pressure. The resultant residue is then crystallized from methanol containing a trace of pyridine to give 17α-ethyl-3-methoxyspiro(estra-2,5(10)-diene-16,1'-cyclopropan)-17β-ol melting at about 60–67° C. Infrared maxima are observed at 2.78 (2.89), 5.80, and 6.01 microns.

A solution of 2.4 parts of the above diene in 40 parts of methanol, 5 parts of acetic acid and 1 part of water is allowed to stand for 16 hours at room temperature under a nitrogen atmosphere. The addition of ice and water to the mixture causes a gum to form. The mixture is then extracted into methylene chloride. The resultant extract is then washed and dried and the solvent is evaporated under reduced pressure to give a glass which is 17α-ethyl-17β-hydroxyspiro(estr - 5(10) - ene-16,1'-cyclopropan)-3-one. Infrared maxima are observed at 2.78 (2.89) and 5.83 microns.

To a solution of 1.9 parts of the 5(10)-olefin obtained in the preceding paragraph in 15 parts of methanol under a nitrogen atmosphere, there is added 0.4 part of 4 N sodium hydroxide solution. The solution is allowed to stand for 90 minutes before it is diluted with water and extracted with methylene chloride. The combined extracts are washed and dried and the solvent is evaporated under reduced pressure to leave a residual glass. This is crystallized once from cyclohexane and then twice from methanol to give 17α-ethyl-17β-hydroxyspiro(estr-4-ene-16,1'-cyclopropan)-3-one melting at about 139–140° C. Infrared maxima are observed at 2.78 (2.89), 6.02, and 6.18 microns.

Example 7

A solution of 2 parts of sodium borohydride in 60 parts of water is added to a solution of 12 parts of 3-methoxyspiro(estra-1,3,5(10)-triene-16,1'-cyclopropan)-17-one in 240 parts of 2-propanol. The resultant solution is heated at 60° C. for 2 hours. A slight excess of acetic acid is then added and the resultant solution is concentrated to a small volume and diluted with water. A crystalline precipitate forms. This is recrystallized twice from ethanol and then from ethyl acetate to give 3-methoxyspiro-(estra-1,3,5(10)-triene-16,1'-cyclopropan)-17β-ol melting at about 147–148° C.

*Example 8*

9 parts of sodium is added to a stirred solution of 3-methoxyspiro(estra-1,3,5(10)-triene - 16,1'-cyclopropan)-17β-ol in 500 parts by volume of redistilled liquid ammonia, 225 parts of tetrahydrofuran and 65 parts of t-butyl alcohol. After about 90–120 minutes, the sodium reaction is complete and excess methanol is added to the solution. Low boiling solvents are then removed by steam distillation. The granular product in the residue is separated, washed with water, and dried. Recrystallization from ethyl acetate gives 3-methoxyspiro(estra-2,5(10)-diene-16,1'-cyclopropan)-17β-ol melting at about 163–165° C. Infrared maxima are observed at 2.70, 5.87, and 5.98 microns.

*Example 9*

A suspension of 1.7 parts of crude 3-methoxyspiro-(estra-2,5(10)-diene-16,1'-cyclopropan)-17β-ol in 55 parts of 0.5 N hydrogen chloride-10% aqueous methanol is heated at gentle reflux for 15 minutes. The resultant solution is diluted with water and then cooled in an ice bath. The solid which forms is separated and then recrystallized, first from cyclohexane-benzene, and then from aqueous ethanol, to give 17β-hydroxyspiro(estr-4-ene-16,1'-cyclopropan)-3-one melting at about 172–174.5° C.

This compound can also be prepared through the estra-5(10)-ene in the following manner. A suspension of 2 parts of crude 3-methoxyspiro(estra-2,5(10)-diene-16,1'-cyclopropan)-17β-ol in 50 parts by volume of 10% acetic acid in methanol is heated at reflux for 30 minutes. Then, sufficient water is added to cause incipient turbidity and the mixture is treated with charcoal and filtered. The first solid material which forms in the filtrate is removed by filtration and the resultant solution is cooled further. The additional solid which precipitates is separated and recrystallized from aqueous methanol to give 17β-hydroxyspiro(estr-5(10)-ene-16,1'-cyclopropan)-3-one melting at about 143–147° C. This compound can be isomerized to the corresponding estr-4-ene according to the procedure described in the last paragraph of Example 3.

*Example 10*

A solution of 10 parts of crude 3-methoxyspiro(estra-2,5(10)-diene-16,1'-cyclopropan)-17β-ol in 220 parts of dry toluene and 20 parts of cyclohexanone is mixed with 12 parts of aluminum isopropoxide and heated at reflux under a nitrogen atmosphere for about 30 minutes. The resultant mixture is cooled and washed with Rochelle salt solution and then steam distilled. A crystalline material forms in the residue and this is separated and recrystallized from methanol containing a trace of pyridine to give 3-methoxyspiro(estra-2,5(10)-diene-16,1'-cyclopropan)17-one melting at about 145–151° C. Infrared maxima are observed at 5.79, 5.87, and 5.98 microns.

*Example 11*

A solution of 6 parts of 3-methoxyspiro(estra-2,5(10)-diene-16,1'-cyclopropan)17-one in 180 parts of tetrahydrofuran is stirred with a suspension of 8 parts of lithium acetylide-ethylenediamine complex under an acetylene atmosphere for 12 hours. The resultant mixture is poured into ice and water containing 15 parts of acetic acid. The mixture is then extracted with ether and the combined ether extracts are washed thoroughly with water. The ether solvent is then evaporated to leave a partially crystalline residue. This residue is 17α-ethynyl-3-methoxyspiro(estra-2,5(10)-diene-16,1'-cyclopropan)-17β-ol. It melts at about 148–152° C. after trituration with methanol.

*Example 12*

6.7 parts of 17α-ethynyl-3-methoxyspiro(estra-2,5(10)-diene-16,1'-cyclopropan)-17β-ol is dissolved in 105 parts of methanol and 10 parts of acetic acid by heating at reflux for 15 minutes. The resultant solution is then diluted with 50 parts of water and then heated and concentrated under reduced pressure until a precipitate starts to form. The mixture is then cooled, the solid is separated, washed with water, and dried. It is 17α-ethynyl-17β-hydroxyspiro(estr-5(10)-ene - 16,1' - cyclopropan)-3-one and it melts at about 178.5–181° C. after several recrystallizations from ethyl acetate. Infrared maxima are observed at 2.73, 3.01, and 5.81 microns.

A solution of 1.6 parts of the above ketone and 0.2 part of 4 N sodium hydroxide solution in 15 parts of ethanol is heated on a steam bath under a nitrogen atmosphere for 45 minutes. The solution is then concentrated and diluted with water. The solid which forms is separated and then recrystallized twice from aqueous methanol to give 17α-ethynyl-17β-hydroxyspiro(estr-4-ene-16,1'-cyclopropan)-3-one melting at about 196–198° C. This compound has the following formula

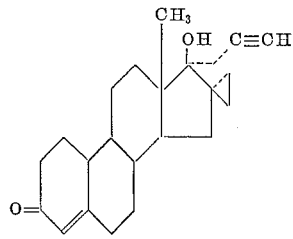

*Example 13*

A solution of 0.2 part of 17α-ethynyl-17β-hydroxyspiro-(estr-4-ene-16,1'-cyclopropan)-3-one in 15 parts of pyridine is hydrogenated over 0.1 part of 5% palladium-on-charcoal catalyst at atmospheric pressure and room temperature for 10 minutes. The catalyst is then separated by filtration and the solvent is evaporated to give residual crude 17β-hydroxy-17α-vinylspiro(estr-4-ene-16,1'-cyclopropan)-3-one. This compound melts at about 150–154° C. after crystallization from ether.

*Example 14*

1-propynyl lithium is substituted for the lithium acetylide and acetylene and the procedure of Example 11 is repeated. The resultant estra-2,5(10)-diene is then hydrolyzed and isomerized according to the procedure described in Example 12 to give 17β-hydroxy-17α-(1-propynyl)spiro(estr-4-ene-16,1'-cyclopropan)-3-one. Hydrogenation of this compound over palladium-on-calcium carbonate according to the procedure described in Example 13 gives 17β-hydroxy-17α-(1-propenyl)spiro(estr-4-ene-16,1'-cyclopropan)-3-one.

What is claimed is:
1. A compound of the formula

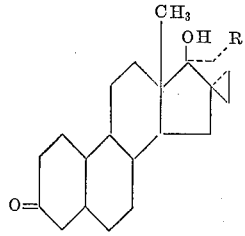

wherein R is selected from the group consisting of hydrogen, lower alkyl, lower alkenyl, and lower alkynyl; and wherein there is a double bond in one of the positions selected from the group consisting of position 4(5) and position 5(10).

2. A compound of the formula

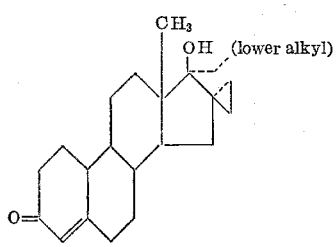

3. 17β-hydroxy - 17α - methylspiro(estr-4-ene-16,1'-cyclopropan)-3-one.
4. 17α - ethyl - 17β - hydroxyspiro(estr-4-ene-16,1'-cyclopropan)-3-one.
5. 17α - ethynyl - 17β - hydroxyspiro(estr-4-ene-16,1'-cyclopropan)-3-one.
6. 17β - hydroxyspiro(estr-4-ene-16,1'-cyclopropan)-3-one.
7. 17β - hydroxy-17α-methylspiro(estr-5(10)-ene-16,1'-cyclopropan)-3-one.
8. 17α - ethyl-17β-hydroxyspiro(estr-5(10)-ene-16,1'-cyclopropan)-3-one.
9. 17β - hydroxyspiro(estr-5(10)-ene-16,1' - cyclopropan)-3-one.
10. 3 - methoxyspiro(estra-2,5(10)-diene-16,1'-cyclopropan)-17β-ol.
11. 3 - methoxy - 17α - methylspiro(estra-2,5(10)-diene-16,1'-cyclopropan)-17β-ol.
12. 17α - ethyl - 3 - methoxyspiro(estra-2,5(10)-diene-16,1'-cyclopropan)-17β-ol.

References Cited by the Examiner
UNITED STATES PATENTS
3,232,963  2/1966  Georgian _____ 260—397.3

LEWIS GOTTS, *Primary Examiner.*

THOMAS M. MESHBESHER, *Assistant Examiner.*

UNITED STATES PATENT OFFICE
CERTIFICATE OF CORRECTION

Patent No. 3,280,156　　　　　　　　　　　October 18, 1966

David A. Tyner

It is hereby certified that error appears in the above numbered patent requiring correction and that the said Letters Patent should read as corrected below.

Column 1, lines 15 to 25, lines 47 to 58, column 2, lines 5 to 16, and column 6, lines 60 to 70, for that portion of the formula, each occurrence, reading

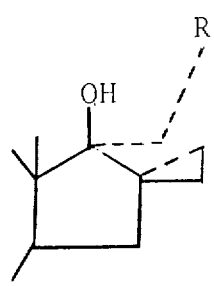　　　read　　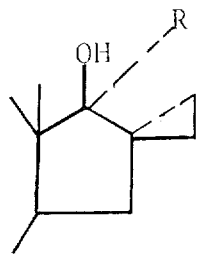

column 3, lines 66 to 75, for that portion of the formula reading

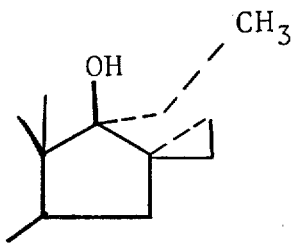　　　read　　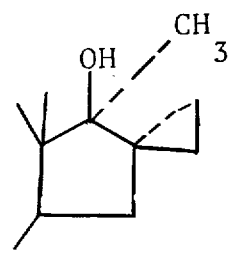

column 6, lines 26 to 35, for that portion of the formula reading

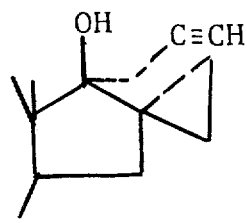　　　read　　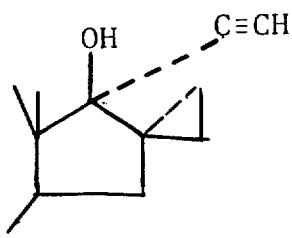

3,280,156 column 7, lines 3 to 11, for that portion of the formula reading

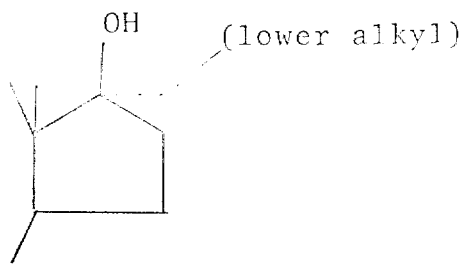    read    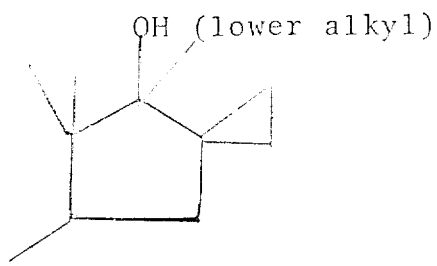

Signed and sealed this 5th day of September 1967.

(SEAL)
Attest:

ERNEST W. SWIDER
Attesting Officer

EDWARD J. BRENNER
Commissioner of Patents